July 15, 1969   E. G. LONG   3,455,077
JOINT SEALING TAPE
Filed Dec. 29, 1964
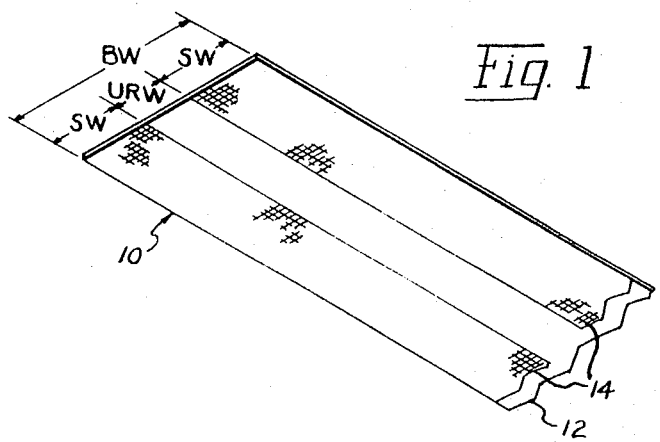
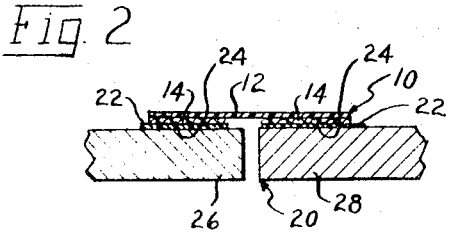
INVENTOR.
Ernest G. Long
BY
John A. McKinney United States Patent Office 3,455,077
Patented July 15, 1969

3,455,077
JOINT SEALING TAPE
Ernest Guinne Long, Martinsville, N.J., assignor to Johns-Manville Corporation, New York, N.Y., a corporation of New York
Filed Dec. 29, 1964, Ser. No. 421,810
Int. Cl. E04b 1/66
U.S. Cl. 52—459          7 Claims

ABSTRACT OF THE DISCLOSURE

A joint sealing tape formed of flexible plastic material which has the characteristic of being stretchable, at least to a limited extent, without rupturing is reinforced by relatively narrow reinforcing strips, the opposing edges of which are spaced to provide a nonreinforced intermediate tape area, which is stretchable in all directions. The reinforced portions resist curling of the tape when exposed to solvent based adhesives, the solvents of which tend to curl the tape before the adhesive has finally set.

---

This invention relates to joint sealing tape such as is used to join opposing wall portions to compensate for expansion and contraction thereof. More particularly, this invention relates to joint sealing tape which is formed of flexible plastic material such as rubber or other rubber-like materials which have the characteristic of being stretchable, at least to a limited extent without rupturing (hereinafter referred to for convenience merely as "elastic").

A frequent problem in joint sealing, particularly in the building industry, is one of providing a material which is capable of being repeatedly stretched to compensate for thermal and pressure changes and yet which is easily applied to the joint. Service conditions frequently dictate the use of a cured elastomer material such as neoprene or ethylene-propylene rubber (EPR). Such materials, however, are difficult to bond. They require solvent based adhesives and the solvents tend to curl the tape before the adhesive has finally set. It is common, to provide sealing tapes which are completely reinforced by the use of one or more layers of reinforcing fabric. However, such full reinforcement detracts from the desired elastic and stretchable characteristics of the main body of the sealing tape.

An important object of the present invention is the provision of a joint sealing tape in which means are provided to deter curling of the tape without substantially detracting from the elastic characteristic of the tape.

The foregoing objects and other ancillary thereto are preferably accomplished, in brief, as follows:

A strip body of elastic material is reinforced along the terminal side thereof with reinforcing strips, preferably fabric or mesh type and having a high tensile strength, as compared to the body of elastic material, to impart resistance to deformation in a direction transverse to the width and the length of the main body of the tape. The tape has an area intermediate the reinforcing strips which is unreinforced and hence is stretchable in all directions and responsive to thermal and pressure changes without rupture.

A preferred embodiment of the present invention is shown in the accompanying drawing, in which:

FIG. 1 is a pictorial view of a strip fragment of tape of this invention; and

FIG. 2 is a cross-sectional elevational view of a joint embodying the sealing tape of this invention.

Referring more specifically to the drawing, the reference numeral 10 designates the joint sealing tape. The tape 10 comprises a body 12 of elastic material, which is capable of being repeatedly stressed and stretched without rupturing. In the preferred embodiment of this invention, the body 12 is formed from an elastic material such as neoprene or ethylene-propylene rubber. Reinforcing strips 14 are provided along the terminal sides of the body 12. The reinforcing strips may be of open weave fabric, which fabric is skim coated onto the elastomer 12 before the elastomer is finally cured. However, the reinforcing strips may be of other materials which have a high tensile strength as compared to the elastic material. Such strips may be either metallic or non-metallic and embedded into the surface of the elastic body 12.

The space intermediate the strip widths SW is unreinforced and is designated by the letters URW.

When the joint sealing tape 10 is put to use in forming a joint seal, generally designated by the numeral 20 in FIG. 2, adhesive 22 is applied to the terminal sides of the surfaces 24 of mutually opposing wall portions 26 and 28. The flexible expansion joint is then formed by adhering the tape 10 to the wall portions by placing the reinforced sections or strips 14 of the tape on the areas covered by the adhesive. Without the reinforcing sections 14 the adhesive, particularly those containing solvents, would tend to swell the elastic or plastic material 12 and cause it to curl or buckle and present an unsightly appearance. Further, such buckling tends to disrupt the bond between the sealing tape and the wall portion and sometimes leaks result.

In the expansion joint described above, the tendency for the tapes to curl in a transverse direction, caused by the bottom side of the tape expanding at a greater degree than the top side of the tape, has been eliminated by the tensional effect of the bottom side reinforcement without detracting from the ability of the tape to stretch and compensate for expansion and contraction or other shifting movement of the wall portions.

To provide a further disclosure of a preferred embodiment of this invention, the following description is submitted. Strips 14 of open weave glass fabric were skim coated on a length of EPR tape before the EPR was finally cured. The width of the tape 10, designated as BW in FIG. 1 of the drawing, was 9 inches and the width SW of the strips 14 was 3½ inches each, thus leaving a width of 2 inches in the area intermediate the strips unreinforced; and the thickness of the tape was 30 mils. This tape was applied to the joint formed by opposing wall portions having an outer layer of elastomer material on which outer layer an adhesive of high molecular weight polyisobutylene containing some low molecular weight polymer and also containing V.M. and P. (Varnish Maker's and Painter's grade) naphtha as the solvent was applied. The tape was then adhered to the wall portions by placing the reinforced section in contiguous contact with the adhesive. The adhesive was permitted to set and the tape retained its dimensional stability without detracting from its ability to stretch in the area designated as URW.

What I claim:

1. A joint sealing tape, comprising
   (a) a first strip comprised of flexible plastic material having the characteristic of being stretchable, at least to a limited extent, without rupturing, and
   (b) reinforcing strips of lesser width than the width of the first strip adhered thereto along the length of the first strip,
   (c) the reinforcing strips being laterally spaced apart in the direction of the width of the tape,
   (d) the reinforcing strips imparting resistance to deformation in a direction transverse to the width and length of the first strip, and
   (e) the first strip, in the area between the reinforcing strips, being stretchable in all directions to the extent permitted by the flexible plastic material thereof.

2. A joint sealing tape as recited in claim 1, wherein the width of each reinforcing strip is at least one-third the width of the first strip.

3. A joint sealing tape as recited in claim 1, wherein the flexible plastic material is a cured elastomer material which tends to curl when contacted by an adhesive containing solvents which affect the tensile strength of the cured elastomer material.

4. A tape as described in claim 1 wherein: said body portion is comprised of ethylene-propylene rubber, and said strips are comprised of open weave glass fabric and are skim coated onto said rubber before final cure.

5. A flexible expansion joint comprising:
  (a) mutually opposing wall portions which may shift in respect to each other in response to thermal and pressure changes;
  (b) a tape joining said wall portions and being secured thereto by a solvent based adhesive,
  (c) the solvent in said adhesive having a tendency to curl said tape in the absence of reinforcement,
  (d) said tape including a first strip of flexible plastic material capable of being stretched, at least to a limited extent, without rupturing and the strip being reinforced with narrower reinforcing strips embedded in said material in laterally spaced apart areas,
  (e) said reinforcing strips having a high tensile strength as compared to said flexible plastic material, and imparting resistance to deformation in a direction transverse to the width and length of said first strip, and
  (f) said tape having an unreinforced area intermediate said reinforcing strips which is stretchable in all directions.

6. A joint as described in claim 5, wherein: said adhesive is of high molecular weight polyisobutylene containing low molecular weight polymer and a naphtha solvent.

7. A joint as described in claim 6 wherein: said body portion is comprised of ethylene-propylene rubber, said strips are comprised of open weave glass fabric and are skim coated onto said rubber before final cure.

References Cited

UNITED STATES PATENTS

| | | | |
|---|---|---|---|
| 1,774,858 | 9/1930 | Vorbau | 161—36 |
| 2,314,523 | 3/1943 | Speer | 161—125 X |

ROBERT F. BURNETT, Primary Examiner

R. L. MAY, Assistant Examiner

U.S. Cl. X.R.

52—417, 573; 156—71; 161—76, 89, 93, 149